UNITED STATES PATENT OFFICE

2,185,789

THREAD AND FIBER OF ORGANIC THERMOPLASTIC MATERIALS AND PROCESS OF PRODUCING THE SAME

Heinrich Jacqué, Ludwigshafen-on-the-Rhine, Germany, assignor to I. G. Farbenindustrie Aktiengesellschaft, Frankfort-on-the-Main, Germany No Drawing. Application June 26, 1937, Serial No. 150,656. In Germany June 30, 1936

5 Claims. (Cl. 18—54)

The present invention relates to threads and fibers of organic thermoplastic materials and a process of producing the same.

I have found that fibers or threads fit to be spun and possessing excellent mechanical properties can be obtained from organic thermoplastic materials by splitting up to the desired degree of fineness, thin foils, films, bands, tubes or threads of the said materials which have acquired by stretching a high degree of orientation in the longitudinal direction, in the direction of this orientation. This splitting of the unilaterally orientated foils and the like may easily be effected by grating, turning, twisting, brushing or with the reeling, combing or carding machines usual in the hemp, flax or jute industries, or by beating them with wedge- or knife-shaped hammers in the direction of the orientation upon an elastic bottom or by forcing them in the direction of orientation through fluted rollers. By such treatment, the said materials yield more or less long, extremely fine fibers or threads which are similar to natural fibers or also staple fibers. The splitting of the foils and the like is preferably effected at room temperature or at lower temperatures because at higher temperatures the marked orientation of the foils frequently reverts. Suitable highly polymerized thermoplastic masses are for example polymerized vinyl chloride, afterchlorinated polymerized vinyl chloride, polymerized styrene, polymerized vinyl esters, polymerized acrylic compounds and their homologues, polymerized vinyl carbazole, mixed polymerization products of at least two of the said compounds and cellulose derivatives. The preparation of the unilaterally orientated foils, films, bands, tubes or threads may be effected by especially strong stretching between rollers or by drawing foils, films, bands, threads or tubes over heated surfaces, preferably over heated cylinders or through short hot zones with strong stretching in the direction of tension so that they acquire a multiple of their original length. The fibers and threads thus obtained may be twisted in the same way as natural or staple fibers and then worked up into fabrics or brought into a form similar to cotton wool. By warming or steaming they can also be curled like wool. When starting from crapey foils curled fibers are obtained immediately. The fibers or threads obtained according to this invention are irregularly rhomboid or rectangular in the cross-section and possess more or less sharp edges in contrast to the threads and fibers hitherto prepared from the same thermoplastic materials. The filaments prepared from the said fibers and threads can be employed for the same purposes for which filaments of wool, cotton, silk or artificial silk are usually employed. On account of their high resistance to water, acids, alkalies and putrefaction the fibers or threads according to this invention can advantageously be used for the production of fishing nets, filtering-cloth, gaskets and tightening rings. On account of their high elasticity they are also suitable for upholstering purposes. Threads and fibers of polyvinyl chloride are uninflammable. Most of the threads and fibers of the said organic thermoplastic materials have a high electrical insulating power and can therefore advantageously be used for electrical insulating purposes. Compared with the known processes, the process according to this invention has considerable technical advantages. Thus for example no solvent is necessary; this renders the process extremely economical as regards the readiness with which it may be carried out in practice. It is also possible to prepare threads even from insoluble or difficultly soluble substances which are very sensitive to temperature, as for example polymerized vinyl chloride of very high molecular weight; this was hitherto impossible.

It is well known that foils or bands which are oriented in only one direction can be broken or split relatively easily in the direction of the orientation. Those foils possessed, however, an insufficient degree of orientation and were too thick and yielded therefore, when split in the direction of orientation, only more or less jagged splinters or even powders, but no fibers or threads as are obtained by splitting thin foils, bands and the like having a high degree of orientation according to the present invention.

There does not exist any certain limit just to all organic thermoplastic materials as to the degree of orientation and of the thickness which foils, bands and the like must possess in order to be capable for being split to threads or fibers according to this invention. The limits vary for the different thermoplastic materials. Generally speaking, the foils, bands and the like must have such a high degree of orientation and must be so thin that they are split to fibers or threads when being brushed or when being twisted.

The following examples will further illustrate how the present invention may be carried out in practice, but the invention is not restricted to these examples.

Example 1

A foil of afterchlorinated polymerized vinyl chloride which has been stretched to about 45 times its original length by moving a 0.04 mm. thick foil at a speed of 0.25 m. per minute to a cylinder heated to about 135° C. and drawing it over the cylinder with a speed of 11.5 m. per minute. The foil thus obtained has a thickness of about 0.001 millimetre is cut into strips about 3 millimetres in width. One or more of such strips are drawn between two rubber plates which are slid backwards and forwards by slight pressure perpendicularly to the direction of the strips. By the friction and rolling action thus taking place, the strips are split up into very many single threads which may be further split and arranged parallel to each other by a rotating cylindrical brush. The threads and fibers thus obtained yield, after spinning and twisting, threads of silky lustre and good mechanical properties and especially a very high tensile strength.

One of the rubber plates which slide backwards and forwards may also be constructed with advantage as a rotary cylinder or endless rubber band which moves forward simultaneously with the foils or bands to be split.

The foils may also be split to a ball of fibers placing them separately in their layers between two or more brushes which are moved backwards or forwards in the direction of orientation. The fibers obtained can be spun to yarns similarly to staple fibers and the yarns can be worked up to filaments.

Example 2

A polymerized styrene foil, which has acquired about 7 times its original length by stretching in one direction over a cylinder heated to about 120° C. and which has a thickness of about 0.006 millimetre is split up into single threads in the manner described in Example 1.

Example 3

A small band of afterchlorinated polyvinyl chloride similar to that described in Example 1 but having a thickness of about 0.0025 millimetre is put into a silk twisting machine, in which it gets a twist of about 1000 turnings per meter. The direction of the twist is changed thereby from 3 to 4 times. The band is split by that treatment into fine threads having a curling like wool.

By twisting the threads obtained by applying about 200 turnings per meter a fast closed thread of a silk-like lustre is obtained.

In a similar manner there can also be worked up bands of polystyrene of a high degree of orientation and about 0.05 millimetre thickness.

Example 4

A foil of polyvinyl chloride of a high degree of polymerization which is 0.015 millimetre thick and which was stretched in the thermoplastic state to a multiple of its original length, is dipped for a short time into dioxane or benzene and then treated between two rubber plates similar as described in Example 1. The foil is thus split to fibers which can be worked up to yarns and filaments in the manner usual for staple fibers.

What I claim is:

1. A process of producing threads and fibers from highly polymerized organic materials which comprises forming a thin film of the material and stretching it in the direction of its length sufficiently to produce an orientation of the molecules in the direction of length and to render the film capable of disintegration by friction into fibers, and frictionally working the film to disintegrate it into fibers.

2. A process of producing threads and fibers from highly polymerized organic materials which comprises forming a thin film of the material and stretching it in the direction of its length sufficiently to produce an orientation of the molecules in the direction of length and to render the film capable of disintegration into fibers, and twisting the film to disintegrate it into fibers.

3. A process of producing threads and fibers from highly polymerized organic materials which comprises forming a thin film of the material and stretching it in the direction of its length sufficiently to produce an orientation of the molecules in the direction of length and to render the film capable of disintegration into fibers, and brushing the film to disintegrate it into fibers.

4. A process of producing threads and fibers from highly polymerized organic materials which comprises forming a thin film of the material and stretching it in the direction of its length sufficiently to produce an orientation of the molecules in the direction of length and to render the film capable of disintegration into fibers, and rubbing the film to disintegrate it into fibers.

5. Threads and fibers of highly polymerized organic materials being from rhomboid to rectangular in the cross-section and possessing sharp edges, produced in accordance with the process defined in claim 1.

HEINRICH JACQUÉ.